United States Patent [19]

Wallis

[11] 4,076,103

[45] Feb. 28, 1978

[54] LUBRICATING MEANS FOR GAS-OPERATED CYLINDERS

[76] Inventor: Bernard J. Wallis, 25200 Trowbridge Ave., Dearborn, Mich. 48124

[21] Appl. No.: 722,863

[22] Filed: Sep. 13, 1976

[51] Int. Cl.² ............................................. F16N 1/00
[52] U.S. Cl. ....................................... 184/25; 92/153; 267/119; 277/19
[58] Field of Search ...................... 184/5, 6, 26, 18, 19, 184/24, 25, 100, 102; 277/17–19, 21; 267/118, 119; 92/153, 154, 156

[56] References Cited

U.S. PATENT DOCUMENTS

| 968,132 | 8/1910 | Coyne et al. ............................ 277/18 |
| 1,010,498 | 12/1911 | Hultgren ................................ 277/18 |
| 1,200,001 | 10/1916 | McClelland .................. 184/102 UX |
| 2,595,878 | 5/1952 | Parsons ............................... 92/153 X |
| 3,202,411 | 8/1965 | Heiser .................................... 267/119 |
| 3,943,717 | 3/1976 | Schexnayder ...................... 277/19 X |
| 3,947,005 | 3/1976 | Wallis .................................... 267/119 |

*Primary Examiner*—David H. Brown
*Attorney, Agent, or Firm*—Barnes, Kisselle, Raisch & Choate

[57] ABSTRACT

In a gas-operated cylinder, the surfaces of the cylinder and piston that are in sliding contact are lubricated by an oil-impregnated wick disposed in an annular chamber at the rod end of the cylinder. The wick extends through radially inwardly extending openings in the chamber to contact the piston rod and also through axial openings in the chamber to contact the back side of the piston when the latter moves to the rod end of the cylinder.

10 Claims, 3 Drawing Figures

LUBRICATING MEANS FOR GAS-OPERATED CYLINDERS

This invention relates to fluid cylinders and, more specifically, to means for lubricating piston-cylinder units of the type operated by gas under pressure in a closed fluid system.

In metal die forming operations it is common practice to yieldably restrain movement of movable die members by means of fluid springs. Frequently such fluid springs comprise piston-cylinder units connected to a reservoir of gas under pressure, such as nitrogen. With such closed pressure systems the gas itself does not contain a lubricant, as is the case with systems wherein piston-cylinder units are operated by pressurized air supplied by a compressor and the air lines are equipped with lubricators. Thus, in closed type systems of the type to which the present invention relates in order to reduce wear and minimize service problems it is desirable to provide auxiliary means to lubricate the surfaces of the cylinder, piston and piston rod which are in sliding contact.

The present invention has for its primary object the provision of a novel lubricating arrangement for such piston-cylinder units which is of economical construction and which is easily serviceable.

More specifically, the present invention contemplates the provision of a readily accessible chamber at the rod end of a cylinder in which there is arranged a lubricant-impregnated wick having a portion thereof projecting into the idle chamber of the cylinder, that is, the chamber through which the piston rod extends. The wick is also preferably arranged so that it contacts the piston rod. Thus, with the arrangement of this invention, whenever the piston is reciprocated in the cylinder, the piston rod is lubricated, and, whenever the piston is retracted in the cylinder to a predetermined position, the back face thereof contacts the portion of the wick projecting into the cylinder which supplies lubricant to the faces of the piston and cylinder which are in sliding contact.

Other objects, features and advantages of the present invention will become apparent from the following description and accompanying drawing, in which.

Figure 1:
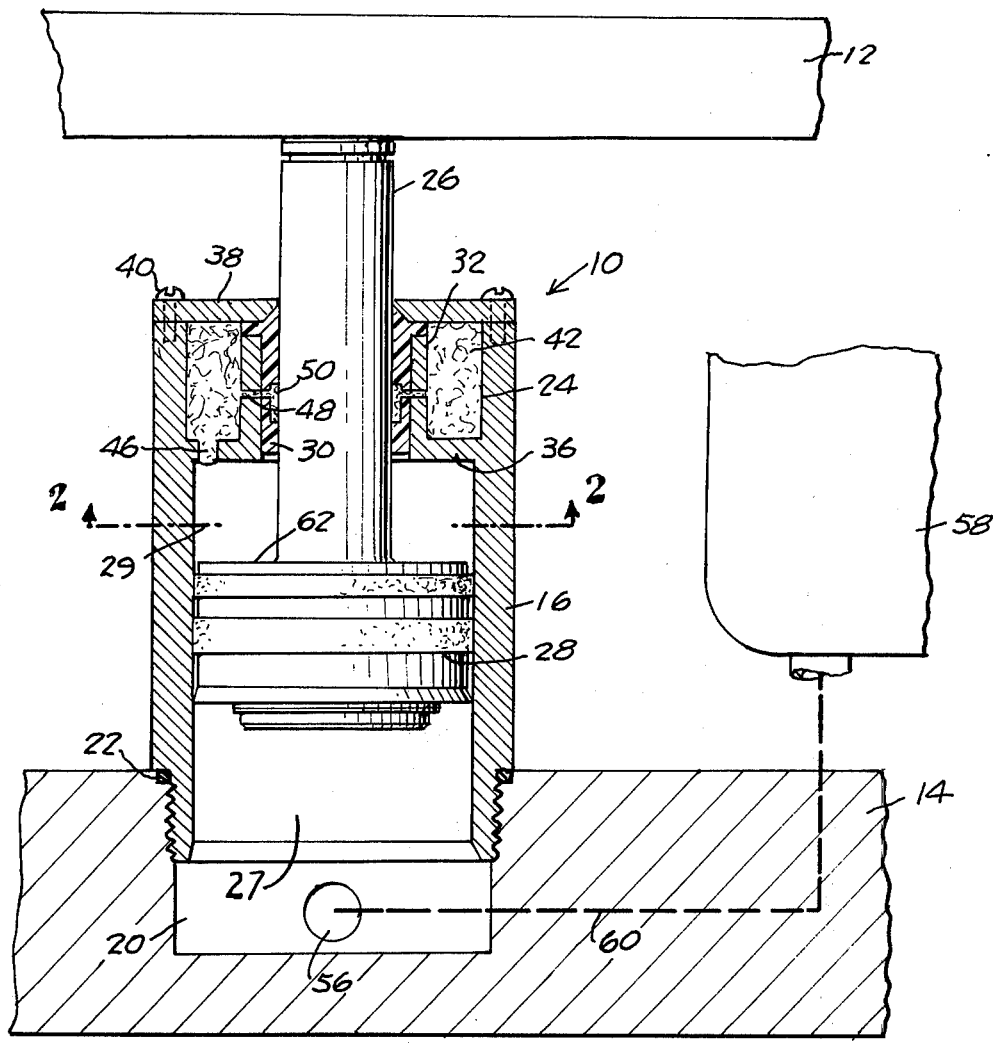
FIG. 1 is a fragmentary vertical sectional view of a gas-operated piston-cylinder assembly according to the present invention illustrating the manner in which it is used in a die assembly.
Figure 2:
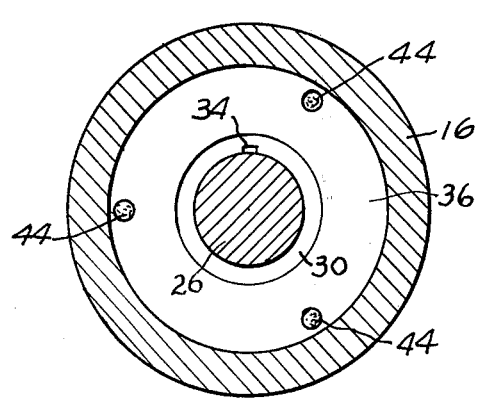
FIG. 2 is a sectional view along the line 2—2 in FIG. 1.
Figure 3:
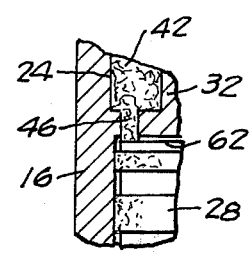
FIG. 3 is a fragmentary view of a portion of the arrangement illustrated in FIG. 1 showing the piston at the upper end of its stroke.

Referring to FIG. 1, there is illustrated a fluid spring, generally designated 10, in the form of a piston-cylinder unit which, in accordance with the present invention, is arranged between a vertically movable die member 12 and a fixed support 14 which, in the illustrated arrangement, comprises a manifold plate of a die assembly. The overall arrangement shown in FIG. 1 is generally similar to that illustrated in my copending application Ser. No. 559,660, filed Mar. 19, 1975. Piston-cylinder unit 10 comprises a cylinder sleeve 16 which is threaded as at 18 into a bore 20 in a manifold plate 14. A rubber O-ring 22 seals the threaded connection between sleeve 16 and manifold plate 14. Adjacent the upper end thereof sleeve 16 is formed with an annular chamber 24 which extends around the rod 26 of a piston 28 slideably arranged within sleeve 16. Piston 28 divides the cylinder into a pressure chamber 27 and an idle chamber 29. A plastic bushing 30 is interposed between the inner wall 32 of chamber 24 and piston rod 26. Bushing 30 is formed with a small axially extending groove 34 in the full length thereof (FIG. 2) for admitting and exhausting air from idle chamber 29 as the piston reciprocates. One end of chamber 24 is defined by an end wall 36 which is common to the idle chamber 29. The opposite end of chamber 24 is defined by a cover 38 which is removably secured to the upper end of cylinder sleeve 16 by screws 40. Within chamber 24 there is arranged a wick 42 which is impregnated with a lubricant, such as oil. Wick 42 preferably comprises a fibrous material, such as felt or the like. End wall 36 is formed around its outer periphery with a plurality of openings 44 through which wick 42 extends as at 46. The impregnated wick 42 is arranged to extend through openings 44 slightly beyond the face of end wall 36. The inner peripheral wall 32 of chamber 24 is likewise provided with a plurality of radially extending openings 48 which register with pockets 50 around the inner periphery of bushing 30. If desired, pockets 50 can be formed as a circumferentially continuous groove around bushing 30. In either event, the oil-impregnated wick 42 extends through openings 48 and into pockets 50.

As pointed out above, piston 28 divides the bore of sleeve 16 into an idle chamber 29 and working chamber 27. Working chamber 27 is open at its lower end and communicates with bore 20 in manifold plate 14. A port 56 in bore 20 communicates with a gas reservoir 58 by means of a passageway 60. Reservoir 58 is filled with a gas, such as nitrogen, and charged to a predetermined high pressure.

From the above description the operation of the lubricating means disclosed is apparent. When die member 12 is in its uppermost position the free end of piston rod 26 abuts the bottom face of die member 12 and is urged upwardly thereagainst by reason of the gaseous pressure in the working chamber 54 connected to reservoir 58. As die member 12 descends piston 28 is displaced downwardly within sleeve 16 and the lubricant-impregnated wick in pockets 50 contacts and lubricates piston rod 26. When the downward pressure on die member 12 is relieved on the up stroke of the press, the pressure in chamber 54 urges piston 28 upwardly to a position wherein the back face 62 of the piston is contacted and lubricated by the projecting portions of the lubricant-impregnated wick in openings 44.

In the drawing die member 12 is illustrated in an intermediate position. It is preferred that the vertical travel of die member 12 is such that the upper end of piston rod 26 is at all times in abutting relation with die member 12 and that the upward travel of die member 12 is limited to a predetermined position wherein the back face 62 of piston 28 just contacts the portion of the impregnated material 42 projecting through the openings 44. In this position the back face 62 of the piston does not actually contact the lower face of end wall 36, but is spaced slightly therefrom. This insures the application of lubricant to the piston on each retraction stroke thereof. Since openings 44 are located around the outer periphery of wall 36, the lubricant is applied to the piston directly adjacent the outer periphery thereof and lubrication of the bore of cylinder 16 is assured.

I claim:

1. In combination, a cylinder, a piston in said cylinder dividing the cylinder into a working chamber and an idle chamber which vary inversely in size in response to reciprocation of the piston within the cylinder, said cylinder having an end wall defining one end of the idle chamber, the other end of the idle chamber being defined by the back face of the piston, means for introducing gas under pressure to the working chamber for displacing the piston to a position adjacent said end wall, means on said cylinder defining a lubricant chamber, lubricant-impregnated wick means in said lubricant chamber, passageway means extending between said lubricant chamber and said idle chamber, said wick means having a portion thereof extending through said passageway means into said idle chamber at a location axially adjacent said end wall, whereby, when the piston is displaced to a position axially adjacent said end wall, it is contacted by said wick means so as to apply lubricant thereto.

2. The combination set forth in claim 1 wherein said lubricant chamber is disposed axially outwardly beyond said end wall and said passageway means comprises a plurality of apertures in said end wall.

3. The combination set forth in claim 2 wherein one end of said lubricant chamber opens in a direction axially outwardly of said cylinder and including a cover plate removably secured on said open end of said lubricant chamber.

4. The combination set forth in claim 2 wherein said apertures are disposed adjacent the outer periphery of said end wall.

5. The combination set forth in claim 2 including means independent of said lubricant chamber for permitting the flow of air into and out of said idle chamber in response to reciprocation of said piston.

6. The combination set forth in claim 2 wherein the piston is provided with a rod extending through said end wall, said lubricant chamber extending around said piston rod.

7. The combination set forth in claim 6 wherein said lubricant chamber is provided with a cylindrical wall surrounding said piston rod, said cylindrical wall having a radially extending aperture therethrough, a portion of said lubricant-impregnated wick means extending through said radially extending member and contacting the piston rod.

8. The combination set forth in claim 2 including means for limiting the stroke of the piston in one direction to a position wherein the piston contacts the projecting portion of said lubricant-impregnated member.

9. The combination set forth in claim 8 wherein said limiting means are arranged to prevent contacting engagement between the piston and said end wall.

10. The combination set forth in claim 8 wherein the piston rod projects axially outwardly beyond said cylinder, said last-mentioned means comprising means engaging the outer edge of the piston rod.

* * * * *